Figure 3:
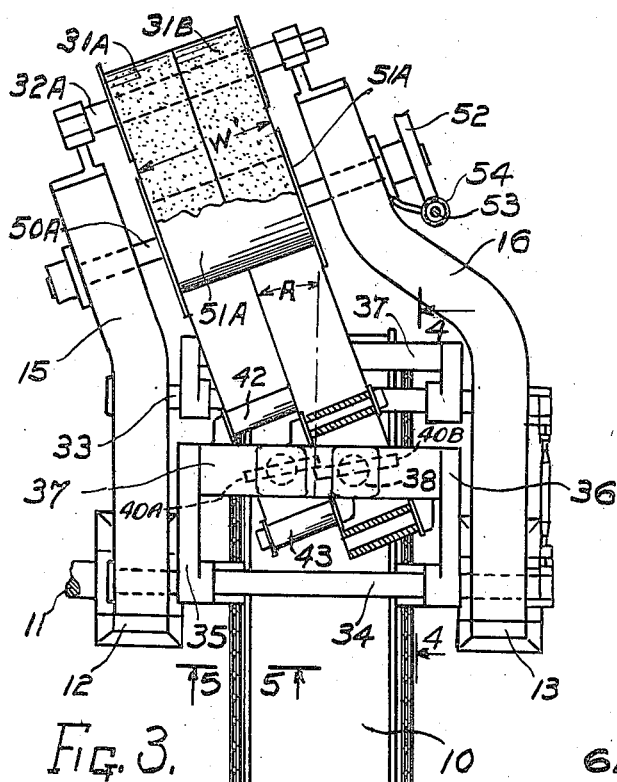

May 11, 1948. L. ILLMER ET AL 2,441,243
GRINDER MACHINE OF THE ENDLESS WORK PIECE TYPE
Filed Nov. 28, 1944 2 Sheets-Sheet 1
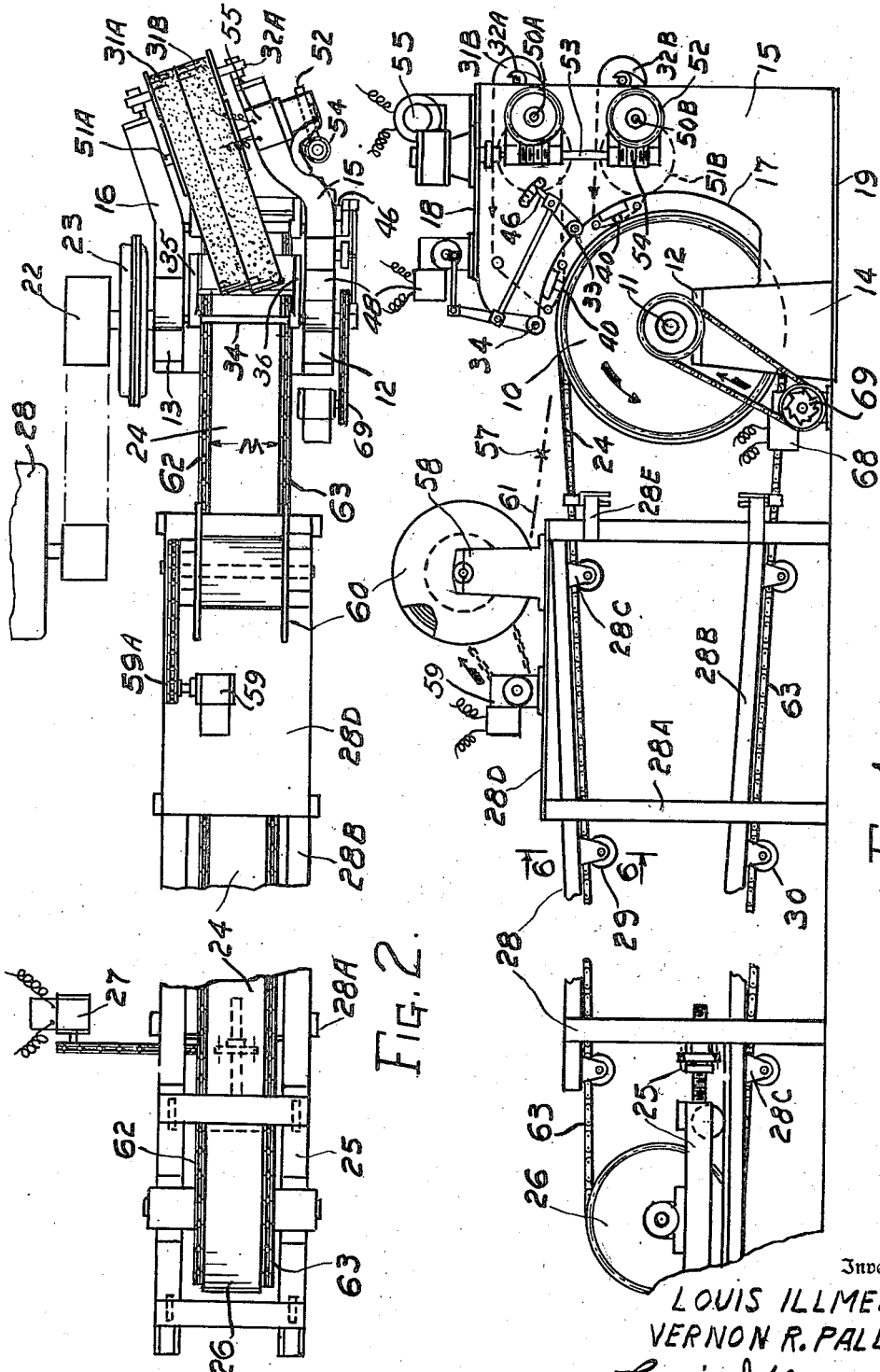
Inventors:
LOUIS ILLMER
VERNON R. PALLAS
Louis Illmer Attorney May 11, 1948. L. ILLMER ET AL 2,441,243
GRINDER MACHINE OF THE ENDLESS WORK PIECE TYPE
Filed Nov. 28, 1944 2 Sheets-Sheet 2

Inventors:
LOUIS ILLMER
VERNON R. PALLAS.
Louis Illmer Attorney

Patented May 11, 1948

2,441,243

UNITED STATES PATENT OFFICE 2,441,243

GRINDER MACHINE OF THE ENDLESS WORKPIECE TYPE

Louis Illmer, Cortland, N. Y., and Vernon R. Pallas, Rootstown, Ohio

Application November 28, 1944, Serial No. 565,486

12 Claims. (Cl. 51—150)

The present invention broadly relates to a novel system for surface grinding, and is more particularly directed to improved equipment adapted to efficiently abrade an endless band of sheet metal, multiple strips or the like reelable flat stock while operatively belted about the perimeter of a driven drum or rotor. Our machine drags its work piece in a closed circuit and is designed to rapidly pregrind or to polish high-tensile sheet stock which when run longitudinally, of itself furnishes the necessary velocity for intensive cutting action upon having abrasive means applied thereto.

The instant mode of treatment is in part based upon the teachings set forth in our prior Patent No. 2,338,644, issued January 4, 1944, in which multiple cutting zones are distributed in an arc lying about a rotor axis.

It is preferred to work with a power driven rotor of adequate diametral size and house the same between laterally spaced frame standards. Interposed racks may mount multiple tape supply spools and corresponding takeup reels that positively feed comparatively narrow multiple tapes through their respective cutting zones at a slow rate of linear advance. These component tapes may herein be fed obliquely of the work piece travel course so as to span tape interspaces or gaps in a biased direction. Our tape disposition is such as to constitute a combined cutting zones length that collectively spans the entire strip width of the work piece in order to treat the whole extent thereof in a single pass.

Adjoined ends of our endless work piece may be cleated or welded in place. The use of guide chains allows of quickly replenishing a completed stock batch to attain a well sustained machine output requiring the minimum of labor cost and shutdown period between successive grinder runs.

The object of our invention is to devise a simplified grinder machine of the indicated character adapted to handle a long length of strip stock on a rapid low cost production basis per square foot of output, and is also concerned with guided multiple abrasives arranged flatwise in close adjacency without marginal overlap and in such formation moved obliquely to the direction of longitudinal work piece travel. Embodied herein are also divers control refinements and improved power driven accessories that dispatch machine servicing.

Reference is had to the accompanying two sheets of drawings which represent an illustrative exemplification and in which:

Fig. 1 is an elevational side view of an assembled grinder machine of which the conveyor portion has been medially broken to shorten its overall length, and Fig. 2 shows a top view thereof.

Figure 4:
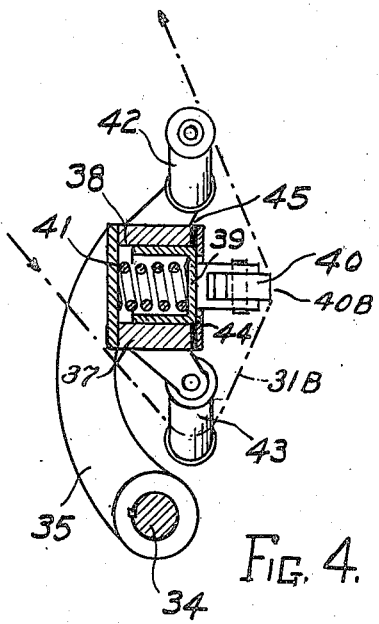

Fig. 3 fragmentally details a trunnion shaft and affixed levers of which the free ends are bridged by header means, and Fig. 4 is taken cross-sectionally along 4—4 of Fig. 3.

Figure 5:
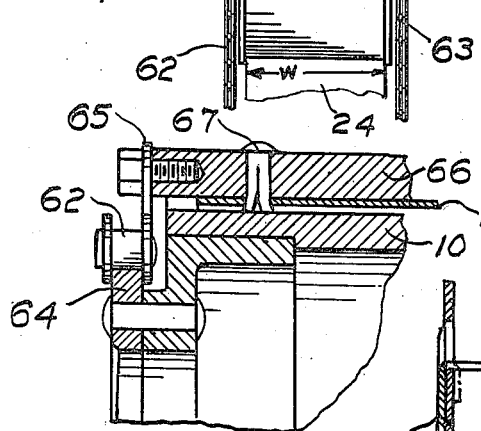

Fig. 5 fragmentally depicts a corner region of our rotor taken along 5—5 of Fig. 3.

Figure 6:
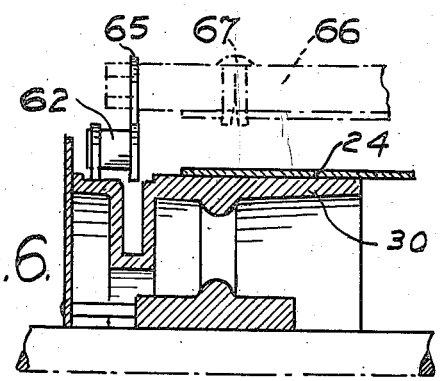

Fig. 6 shows a detail of a conveyor type of idler roller taken along 6—6 of Fig. 1.

Figures 7, 8:
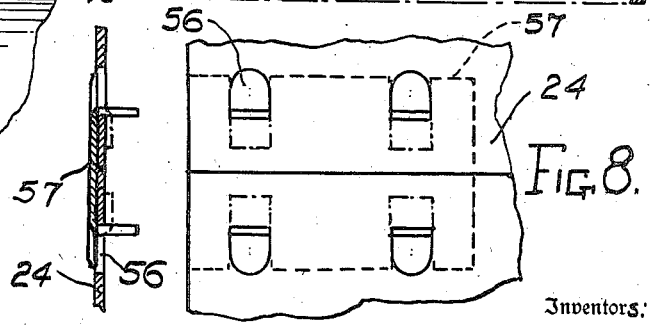

Figs. 7 and 8 respectively detail a preferred style of fastener clip for temporarily securing the split ends of a driven belt.

Referring more specifically to Figs. 1 and 2, such grinder arrangement may comprise a driven flanged rotor 10 including a flat faced rim operatively supported upon the axle 11. Said axle may span the main bearings 12 and 13 mounted upon the laterally spaced pedestals such as 14, that respectively project forwardly from a pair of cored housing columns 15 and 16. The contour of each such column may be recessed to provide for a throat region 17 that amply clears the rotor perimeter for servicing needs. The rear column edges may be disposed vertically and given a cross-sectionally divergent formation as shown. Top and bottom cross plates 18 and 19 serve to re-enforce said columns into a unitary structure that fixedly rests upon a suitable foundation.

The rotor axle 11 may be driven from a primary motor 20 by the tractor pulley 22 that operates through a planetary gear reducer installed within the casing 23. In order not to subject the applied strip stock to excessive bending stress, the rotor should be held to a comparatively large diametral size. It may be rotated in the arrowed direction (see Fig. 1) at a speed to impart a linear velocity of more than one thousand feet per minute to the endless work piece 24. Said work piece may comprise a single endless loop or multiple strips of reelable flat stock laid alongside each other between the rotor flanges within the confines of the strip width marked W.

The forward portion of our rotor is rendered accessible to an attendant for convenient belt replacement. The loop length of such metal band may comprise a stock batch of about one ton in weight and carried forwardly to run over the distant belt tightener unit 25. Such means may include a shiftable pulley 26 mounted to slide on rails and further include driven adjusting means 27 of the remotely controlled motorized type by which to selectively tension the endless work piece 24 from the platform 28D. If desired, the pulley 26 may be made somewhat smaller in diameter than the rotor 10.

The top and bottom span lengths of such tensioned work piece may respectively be upheld under reduced sag, by corresponding rows of idler rollers 29 and 30 arranged in conveyor fashion within the confines of the frame structure 28. Such latticework may comprise erected supports 28A that are respectively bridged by horizontal beams such as 28B serving to mount the roller hangers 28C thereon. Said beams may uphold the work platform 28D and be braced by transverse straps such as 28E.

The out-turned belt face may be treated by the use of a plurality of abrasive tape rolls such as 31A, 31B etc. Certain of these paper backed supply rolls may be carried upon a common spool shaft 32A or 32B. As detailed in Fig. 3, the overall tape width W' is purposely split up into aliquot parts. Each parallel tape component is kept closely spaced in a common plane with respect to its adjacent mate. These tapes are herein simultaneously fed into their respective cutting zones 40A and 40B by slowly advancing the same in an obliquely inclined direction to the rotor axis. For larger rotor sizes, the breadth of our cutting zone measured perimetrically about said axis, may be kept relatively wide and thus maintain a biased cutting lap between next adjacent tape edges that does not produce a ridgelike formation upon the treated surface.

The frame columns 15 and 16 may be spanned by the trunnion shafts 33 and 34. Affixed to the respective end regions of each such shaft, are the guide levers 35 and 36 of which the free extremities may be bridged by a header beam 37 that is rendered shiftable toward or away from the rotor axis.

As exemplified in Fig. 3, each such beam may be provided with one or more transverse bores or the like apertures 38, spaced to correspond with the pitch given to the tapes 31A, 31B etc. A tubular or the like slide 39 may be mounted in each such bore in a registered backing relation to its co-operating tape.

A closed end of each slide may be forked for the reception of a pivotally mounted backing shoe 40. This relatively short shoe may individually overhang its narrow tape and is kept inherently rigid to assure against a dished abrasive cut. Resilient means such as the compression spring 41 may be installed within each slide to floatingly back the shoe thereof. The shoe backing pressure is preferably kept under moderate intensity per square inch of grit contact area to obviate tape tear.

Mated tape guide rollers 42 and 43 may respectively be carried along opposed sides of each header beam in stepped formation as shown and arranged to retain the several parallel tapes in proper shoe registry. The respective axes of such guide rollers are respectively inclined dihedrally with respect to that of our elongated header beam and preferably kept parallel to a reel spindle such as 50A (see Fig. 3). A stop plate 44 arrests slide travel toward the rotor axis. Interposed between each such stop plate and said beam, is a laminated shim 45 which permits its slide travel limit to be adjustably and independently altered.

By appropriately rocking a trunnion shaft by the motorized reducer means 48, the shoes and their associated abrasive tapes may be collectively carried into or out of operative engagement with an exposed face of the work piece 24. The magnitude of the backing pressure which the springs 41 impose upon the several tapes, may be regulated by the tilt given to the loaded header beam 37. A linked graduated pointer 46 visualizes the prevailing setting given to the shoe spring 41. The use of such multiple narrow tapes and their individual shoes, serves to maintain a substantially uniform pressure intensity across the entire belt width W. Such combined cutting result is attained irrespective of the accompanying beam deflection and the thrust of these multiple presser agencies is firmly borne by the underlying rotor rim. The cutting effect of our obliquely disposed tapes as acutely inclined to the work piece travel course, is made substantially equivalent to a corresponding single wide tape but easier to handle and less likely to suffer tear under intense backing pressure.

It is preferred to work with an angular tape bias marked "A" and to collectively group our interspaced tapes divergently with respect to the tangentially directed work piece travel course in the Fig. 3 manner. To obviate interference on part of different tape groups, a set of trunnion shafts such as 33 and 34 may be dihedrally disposed relative to the rotor axis. While only two trunnion shafts are indicated, duplicates thereof may be installed should a more rapid grinding rate be desired. The considerable air-cooling radiation afforded by our long-span belt 24, permits of intensive grinding without overheating the treated stock.

The feed mechanism by which mated tapes may be positively brought into their respective cutting zones at a substantially uniform rate of advance, may reside in driven take-up reels. Angularly inclined reel spindles such as 50A and 50B may each have a relatively large take-up reel 51A or 51B keyed thereon in co-operative registry to the similarly inclined diametrically smaller tape supply spools 31A and 31B. Each such interspaced roll tape may be carried through a U-shaped or return bend travel path as indicated.

A worm gear 52 may be mounted upon each spindle 50A and 50B. A vertical feed shaft such as 53 may be provided with twin worms 54 that respectively engage the worm gear corresponding thereto. The motorized speed reducer means 55 may be coupled to drive said geared worms in unison while the grinder is operative. It is preferred to run the rotor unidirectionally in the arrowed direction while grinding and to keep the tapes taut with respect to the drag exerted by the take-up reels (see Fig. 1).

To recapitulate, our work piece strip is alignedly trained flatwise onto a drum perimeter along a tangentially normal course, i. e. to say, in maintained right-angular travel relationship. It is emphasized that the elongated cutting zones 40A and 40B (see Fig. 3) are herein disposed in conjoined tandem series to extend across the entire strip width W, the interspacing between next adjacent longitudinal edges of our biased tapes being kept in sufficiently close proximity to effect a merging of contiguous zone ends and thereby establish cutting continuity between the outer strip edges in a single pass through such zones without edgewise strip shift.

It now remains to point out the means by which a renewal and frequent replacement of our long endless work piece 24 may be expedited. To this end, the abutting split belt ends may initially be squarely trimmed and at the same time punched with a row of perforations 56 (see Fig. 8). Multiple segmental cleats 57 each including opposed prongs which register with several of such perforations, may serve to splice said ends prior to tensioning the work piece in place by the tightener unit 25.

Assuming a work piece batch to have been completed and that the header beams 37 are retracted into inoperative position, then said splice may be freely carried into the vicinity of the rotor top. Upon stoppage of the tractor pulley 22, the belt tightener may be liberated. After severing one or more of said segmental cleats, the severable work piece ends may be temporarily retained in adjacency by a suitable clamping implement (not shown) and released into a slackened sag condition.

A motorized cradle 58 may be installed upon the platform 28D to demountably carry a crane-serviced stock supply or batch reel 60. Affixed thereto is one end of an interposed lead strip 61 as indicated in dotted and dashed outline. When used, its other end may be secured to a released belt end prior to rewinding a finished belt upon a previously emptied reel 60. The reel motor 59 may be provided with a ratchet driven sprocket 59A that permits an untreated belt forming batch to be drawn off a loaded supply reel.

To facilitate the convenient replacement of such long single loop 24, both the rotor 10 and the tightener pulley 26 may be equipped with interconnecting solitary or dual chain drives or the like supplementary belts such as 62—63. Fig. 5 reveals how the twin chain sprockets 64 may be parallelly disposed at opposite rotor ends and of said tightener pulley. The Fig. 6 flanged idler roller 29 or 30 show each such chain 62 and 63 guided alongside the travel path of a work piece edge. Certain corresponding links of each chain may be provided with a strap extension 65 that projects radially beyond the endless work piece 24 and is adapted to have a bridge bar 66 carried thereacross during a batch renewal period. Said demountable bar may be provided with a series of belt interlocking pins or strip gripping means 67 that respectively register with and may snap into the perforations 56 whereby to guide a newly installed, uncleated batch end lengthwise of the chain travel.

After a finished batch has been rewound upon the reel 60, such product may be replaced by a substitute reel initially having an untreated batch coiled thereon. The free end of such new stock may be pretrimmed and apertured as in Fig. 8 and adapted to engage the bar pins 67 whereby to draggingly install a new batch into place by said chains. Such batch replenishment may be expedited by the motorized auxiliary reducer 68 provided with a ratcheted sprocket 69 that is chain connected to slowly drive the rotor counterwise to its normal arrowed direction. After dragging a new batch into place, the free end of the lead strip 61 is disconnected and the mated ends of a slackened work piece 24 may be drawn together and operatively secured by the cleat devices 57 or equivalent means.

Finally, by tensioning such renewed endless work piece about the rotor 10 and pulley 26, it is prepared to abrasively treat the same upon starting the tractor pulley 22. In this connection, it is pointed out that such highly tensioned work piece of itself affords a substantial grip about the rotor perimeter which is fortified by the radial pressure imposed upon the several backing shoes so as to permit reelable flat stock to be rapidly advanced without undue slippage. The use of our chain also positively drives the tightener pulley 26 which in turn supplements the work piece grip afforded by the driven rotor per se. If desired, abrasive shoes might likewise be distributed about the perimeter of the pulley 26 or placed intermediate the looped belt ends.

Our motorized drives may have all their remote controls centralized on the platform 28D to minimize labor requirements. Such endless belt system needs comparatively little supervision during the active grinding period of an installed batch run. By resort to plural machine units, certain of these may be kept in active operation while a spare unit is having its batch replenished, thus securing a high rate of production, particularly where from .005″ to .010″ high tensile stock removal represents a criterion.

The foregoing rather explicit disclosure will, it is believed, make evident to those skilled in this art the more outstanding commercial and operative advantages afforded by our grinder improvements, and we reserve the right to modify the structural features specifically set forth in our single illustrative embodiment, all without departing from the spirit and scope of our invention heretofore described and more particularly characterized in the appended claims.

We claim:

1. A grinder machine for abrasively treating a length of reelable strip stock and comprising a rotatable drum adapted to have such work piece alignedly trained flatwise onto the drum perimeter along a tangentially normal course, a pair of abrasive tapes operatively borne flatwise in alongside non-overlapping pattern upon a comparatively narrow strip face region extending crosswise of said work piece with the next adjacent inner tape edges closely interspaced and which tapes each provide an elongated cutting zone respectively disposed crosswise of the strip length in a definite position relative to the strip edges, sustained header beam means including presser means applied to thrust said tapes toward their respective zones, drive means for said drum imparting longitudinal movement to the work piece without edgewise shift, means simultaneously advancing said tapes lengthwise in an obliquely inclined direction relative to said work piece course, and dual guide rollers respectively mounted upon a common side of said beam means and respectively having one such obliquely directed tape tangentially trained thereon.

2. A grinder machine for abrasively treating reelable strip stock and comprising a pair of rotatable drums adapted to have an endless length of such work piece trained onto the respective drum perimeters along a tangentially normal course, a pair of abrasive tapes borne flatwise in alongside non-overlapping pattern upon a narrow strip face region extending crosswise of said work piece with their next adjacent inner tape edges closely interspaced, drive means imparting longitudinal movement to the work piece without edgewise shift, and separate means advancing said tapes lengthwise in an acutely inclined direction to the work piece course in a definitely maintained angular relation with respect to the strip edges, the rate of tape advance by the last named means being materially slower than the movement rate imparted to the work piece and which separate means include guide roller means directing said pair of tapes into operative abrasive engagement along the entire length of said narrow strip face region.

3. A grinder machine for abrasively treating reelable strip stock and comprising a pair of rotatable drums adapted to have an endless length of such work piece trained flatwise onto the respective drum perimeters, an elongated abrasive element operatively borne upon a comparatively narrow transverse face region of said work piece to constitute a cutting zone, presser means thrusting the abrasive element toward said zone, means advancing said element lengthwise, means moving the work piece longitudinally, supplemental belt means suspended between said drums in a contiguous cooperative relation to the travel path of the work piece, and detachable work piece gripping means carried by said belt means.

4. An accessory for a grinder machine serving to abrasively treat reelable strip stock and which machine comprises a pair of rotatable drums adapted to have an endless length of such work piece trained flatwise onto the respective drum perimeters along a directed course, an abrasive tape of which a portion is operatively borne upon a comparatively narrow transverse face region of said trained work piece to constitute a cutting zone, means for retracting said tape out of operative association with the work piece, means moving the work piece longitudinally, and which accessory comprises dual supplemental belts respectively supported to run contiguous to an opposed longitudinal work piece edge and having a demountable bridge bar detachably affixed across such belts and to the work piece when said tape is retracted.

5. A grinder machine for abrasively treating successive batches of reelable strip stock and comprising a pair of rotatable drums adapted to have an endless work piece belted flatwise therearound, a sprocket at each end region of said drums, an endless chain interconnecting corresponding sprockets and which chains respectively include a strap extension adapted to demountably install thereacross bridge bar means having batch engaging grip means, abrasive tape means supported by and operatively applied to a side face of said work piece, means driving one such drum to impart longitudinal movement to the work piece, and means advancing said applied tape means in unison with the movement of the work piece.

6. An accessory for a grinder machine serving to abrasively treat successive batch lengths of reelable strip stock and which machine comprises a driven rotor and an axially shiftable belt tightener pulley adapted to have a band of stock embracingly installed therearound and which rotor serves to move such stock longitudinally in a tensioned condition, a conveyor structure interposed between the rotor and pulley, said structure including rollers arranged to engage opposed spanning regions of said belted stock, a supply of abrasive tape, means supportingly advancing said tape supply into operative engagement with a side face of the endless strip stock in unison with the stock movement, and which accessory comprises a stock reel together with dual supplementary belts respectively running contiguous to an opposed longitudinal work piece edge and having a demountable bridge bar attached across such dual belts and to the work piece whereby to withdraw the installed work piece.

7. A grinder machine for abrasively treating a length of flat stock and comprising a rotor drum adapted to have such stock embracingly applied to a perimetric drum portion, drive means serving to drag said stock in a lengthwise travel direction, header beam means having a longitudinal axis that spans the width of said stock, yieldable backing shoe means carried by said beam means and borne by an exposed face of the applied stock, a guide roller supported by said beam means with the roller axis and the beam axis arranged in an angularly inclined relationship, a laterally pliant abrasive element upheld by the aforesaid face in an interposed flatwise relation between said face and the backing shoe means, and means advancing said element tangentially toward the angularly inclined roller, the travel path of said element being laterally deflected by the perimeter of said guide roller.

8. A grinder machine for abrasively treating a length of flat stock and comprising a rotor drum adapted to have such stock embracingly applied to a perimetric drum portion, drive means serving to drag said stock in a lengthwise direction, shiftably mounted header beam means having a longitudinal axis that spans the width of said stock, yieldable backing shoe means carried by said beam means and having the thrust thereof borne by an exposed face of the applied stock, a pair of interspaced guide rollers also carried by the shiftable beam means and which rollers have their respective axes angularly inclined relative to the axis of the beam means, a laterally pliant abrasive element upheld by the exposed face and interposed flatwise between said face and the shoe means, and means for advancing said element tangentially toward said roller in unison with the movement imparted to the dragged stock.

9. A grinder machine for abrasively treating strip stock with abrasive tape and comprising complementary girderlike housing components of which the respective medial regions are spaced in substantial parallelism and having corresponding girder ends that are laterally offset therefrom in a common direction, an axle bridging said medial regions, a driven rotor mounted on said axle and adapted to have a length of strip stock trained flatwise onto the rotor perimeter along a tangentially normal travel course, an actuated off-take reel mounted between said corresponding girder ends, the reel axle being disposed in an obliquely inclined relation to the aforesaid travel course, a guide roller mounted in substantial parallelism with the reel axis, and an abrasive tape dragged lengthwise by the off-take reel over said guide roller into cutting engagement with a strip stock face.

10. An abrasive machine for treating a length of reelable strip stock and comprising a rotor drum adapted to have a work piece face trained flatwise onto the drum perimeter in aligned relationship along a tangentially normal course, a series of guide rollers mounted in tandem contiguous to the rotor perimeter and having the respective roller axes dihedrally inclined in stepped formation with respect to the rotor axis, a mated series of parallel abrasive tapes respectively trained in succession over said guide rollers and operatively borne flatwise in close non-overlapping succession upon a comparatively narrow transverse face region of the work piece extending across the entire work piece width and which tapes are arranged to provide a corresponding series of cutting zones that are definitely positioned with respect to the work piece edges, drive means imparting longitudinal movement to the work piece, and means simultaneously advancing said series of tapes lengthwise in an obliquely inclined direction to the work piece course, such inclined next adjacent tape edges collectively serving to establish cutting continuity between the opposed outer strip edges of said work piece in a single pass through said corresponding zones and which cutting action is uniformly maintained.

11. A grinder machine for abrasively treating a length of reelable strip stock and comprising a rotatable drum adapted to have such work piece alignedly trained flatwise on to the drum perimeter along a tangentially normal travel course, an elongated header beam whose axis is maintained in substantial parallelism with the rotor axis, guide roller means carried alongside said beam and having the axis of the roller means inclined dihedrally with respect to that of the beam, a pair of abrasive tapes tangentially trained over said guide roller means and operatively impressed upon a common work piece face in side-by-side non-overlapping pattern with their inner tape edges kept closely interspaced to establish a pair of cutting zones disposed in tandem, drive means for said drum imparting longitudinal movement to the work piece, and actuated feed roller means mounted in axial parallelism with said guide roller means and which feed roller means slowly advances said tapes lengthwise through their respective zones, the closely spaced inner tape edges being sufficiently inclined to conjointly establish cutting continuity and effect a merging of contiguous zone ends.

12. A grinder machine for abrasively treating a length of reelable strip stock and comprising a rotatable drum adapted to have such work piece alignedly trained onto the drum perimeter along a tangentially normal travel course, support means upholding a row of backing shoes disposed in substantial parallelism with the rotor axis, guide roller means having the axis thereof acutely inclined with respect to said row of shoes, plural roll tapes of which a length portion is trained about said guide roller means and under said shoes into operative engagement with a common work piece face in side-by-side non-overlapping relation with their next adjacent inner tape edges kept closely interspaced to establish tandem cutting zones disposed crosswise of the work piece, drive means for said drum imparting longitudinal travel to the work piece, and actuated feed roller means mounted in axial parallelism with said guide roller means and serving to slowly drag said tapes lengthwise through their respective cutting zones, all the closely spaced inner tape edges being sufficiently inclined with respect to the work piece course to conjointly establish cutting continuity and effect a merging of contiguous zone ends.

LOUIS ILLMER.
VERNON R. PALLAS.

REFERENCES CITED

The following references are of record in the file of this patent:

UNITED STATES PATENTS

| Number | Name | Date |
| --- | --- | --- |
| 1,927,330 | Williams | Sept. 19, 1933 |
| 1,935,660 | Norton | Nov. 21, 1933 |
| 2,183,995 | Mautz | Dec. 19, 1939 |
| 2,187,131 | Lippold | Jan. 16, 1940 |
| 2,331,157 | Arey | Oct. 5, 1943 |
| 2,338,644 | Illmer et al. | Jan. 4, 1944 |

FOREIGN PATENTS

| Number | Country | Date |
| --- | --- | --- |
| 733,970 | France | July 19, 1932 |